(12) United States Patent
Toyoda (10) Patent No.: US 7,580,061 B2
(45) Date of Patent: Aug. 25, 2009

(54) IMAGE SENSING APPARATUS WHICH DETERMINES WHITE BALANCE CORRECTION INFORMATION BEFORE PHOTOGRAPHING

(75) Inventor: Tetsuya Toyoda, Hachioji (JP)

(73) Assignee: Olympus Corporation, Tokyo (JP)

( * ) Notice: Subject to any disclaimer, the term of this patent is extended or adjusted under 35 U.S.C. 154(b) by 849 days.

(21) Appl. No.: 11/040,723

(22) Filed: Jan. 21, 2005

(65) Prior Publication Data
US 2005/0162532 A1 Jul. 28, 2005

(30) Foreign Application Priority Data
Jan. 26, 2004 (JP) .............................. 2004-017450

(51) Int. Cl.
H04N 9/73 (2006.01)
H04N 5/232 (2006.01)
(52) U.S. Cl. .............................. 348/223.1; 348/211.14; 348/224.1
(58) Field of Classification Search .............. 348/223.1, 348/231.6, 211.14
See application file for complete search history.

(56) References Cited

U.S. PATENT DOCUMENTS

| | | | | |
|---|---|---|---|---|
| 5,016,093 A * | 5/1991 | Yoshida | .................... | 348/224.1 |
| 5,461,429 A * | 10/1995 | Konishi et al. | ............... | 348/656 |
| 6,573,931 B1 * | 6/2003 | Horii et al. | ............. | 348/211.14 |
| 6,952,223 B2 * | 10/2005 | Terashita | ................. | 348/222.1 |
| 6,975,351 B2 * | 12/2005 | Ikeda et al. | ............ | 348/211.14 |
| 7,042,499 B1 * | 5/2006 | Kido et al. | ............. | 348/211.14 |
| 7,170,547 B2 * | 1/2007 | Uchiyama et al. | ............. | 348/49 |
| 7,355,636 B2 * | 4/2008 | Takeuchi | ................. | 348/223.1 |
| 2004/0257455 A1 * | 12/2004 | Aoyama | .................. | 348/222.1 |

FOREIGN PATENT DOCUMENTS

| JP | 2000-244930 | 9/2000 |
|---|---|---|
| JP | 2001-339734 | 7/2001 |

OTHER PUBLICATIONS

Chinese Office Action for Chinese Patent Application No. 2005100027876, mailed Aug. 10, 2007 (4 pgs.) with translation (2 pgs.).

* cited by examiner

*Primary Examiner*—M. Lee
*Assistant Examiner*—Hung H Lam
(74) *Attorney, Agent, or Firm*—John C. Pokotylo; Straub & Pokotylo (57) ABSTRACT

An image sensing apparatus according to one mode of the present invention enhances precision of WB adjustment to thereby obtain an image having an appropriate WB, and comprises an image signal processing circuit which adjusts the WB with respect to an image signal output from an image sensing element based on a WB gain, a ROM which stores at least a WB correction coefficient correspondence table, and a WB modification coefficient correspondence table, and a microcomputer which calculates a WB correction coefficient corresponding to a diaphragm value, and a WB modification coefficient based on the correspondence tables and which multiplies the WB gain by the WB correction coefficient and WB modification coefficient to thereby obtain a value as a digital gain and which executes a control in such a manner as to adjust the WB based on the digital gain.

11 Claims, 5 Drawing Sheets

| Diaphragm | F1.4 | F2.0 | F2.8 | F5.6 | F8 | F22 |
|---|---|---|---|---|---|---|
| WB correction coefficient_R | 1.00 | 1.01 | 1.03 | 1.06 | 1.09 | 1.12 |
| WB correction coefficient_B | 1.00 | 1.01 | 1.02 | 1.04 | 1.06 | 1.08 |

FIG. 5

| WB correction coefficient | 1.00-1.02 | 1.03-1.04 | 1.05-1.06 | 1.07-1.08 | 1.09-1.10 | 1.11- |
|---|---|---|---|---|---|---|
| WB modification coefficient_R | 1.00 | 1.01 | 1.02 | 1.02 | 1.03 | 1.04 |
| WB modification coefficient_B | 1.00 | 0.99 | 0.99 | 0.98 | 0.98 | 0.97 |

| WB correction coefficient | 1.00-1.02 | 1.03-1.04 | 1.05-1.06 | 1.07-1.08 | 1.09-1.10 | 1.11- |
|---|---|---|---|---|---|---|
| WB modification coefficient_R | 1.00 | 1.01 | 1.02 | 1.03 | 1.05 | 1.07 |
| WB modification coefficient_B | 1.00 | 0.99 | 0.98 | 0.97 | 0.98 | 0.95 |

F I G. 9

| Diaphragm | | F2.0 | F2.8 | F5.6 | F8 | F22 |
|---|---|---|---|---|---|---|
| WB correction coefficient_R | Zoom state (WIDE) | 1.01 | 1.03 | 1.06 | 1.09 | 1.12 |
| WB correction coefficient_B | | 1.01 | 1.02 | 1.04 | 1.06 | 1.08 |
| WB correction coefficient_R | Zoom state (TELE) | 1.01 | 1.02 | 1.03 | 1.04 | 1.06 |
| WB correction coefficient_B | | 1.01 | 1.01 | 1.02 | 1.03 | 1.04 |

F I G. 10

F I G. 11

IMAGE SENSING APPARATUS WHICH DETERMINES WHITE BALANCE CORRECTION INFORMATION BEFORE PHOTOGRAPHING

CROSS-REFERENCE TO RELATED APPLICATIONS

This application is based upon and claims the benefit of priority from prior Japanese Patent Application No. 2004-017450, filed Jan. 26, 2004, the entire contents of which are incorporated herein by reference.

BACKGROUND OF THE INVENTION

1. Field of the Invention

The present invention relates to a technique for adjusting white balance of an image sensing apparatus comprising an image sensing element.

2. Description of the Related Art

Figure 11:
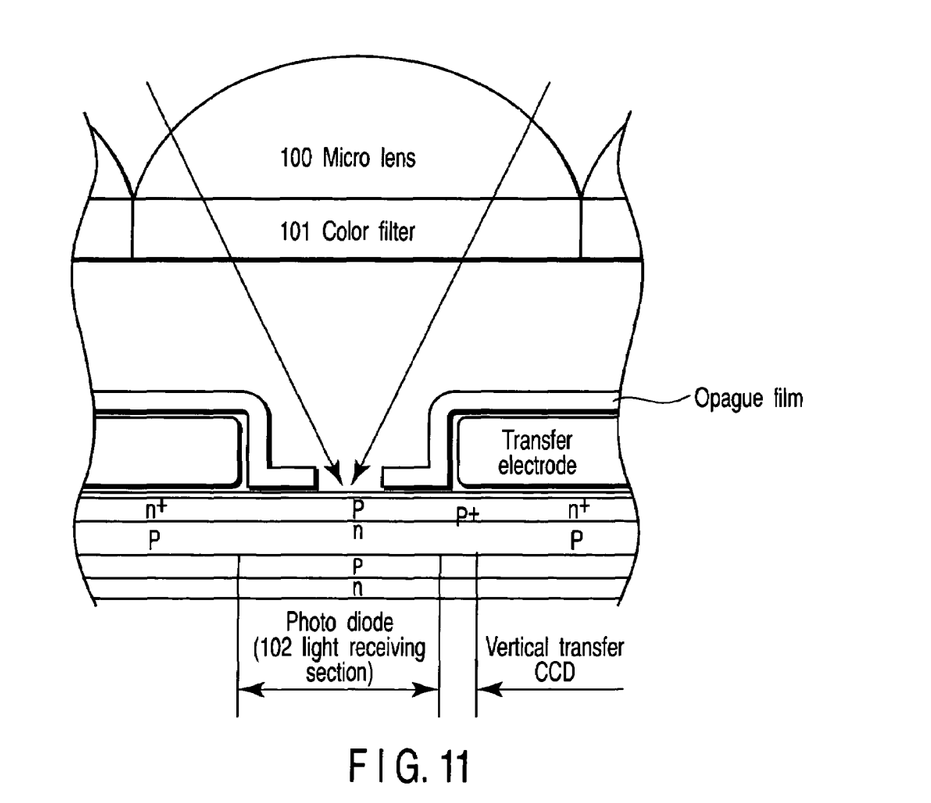
FIG. 11 is an explanatory view of dependence on wavelength, and oblique incidence characteristic of the image sensing element according to a conventional technique.

For example, as shown in FIG. 11, many of image sensing elements have heretofore comprised a micro lens 100, a color filter 101 and the like for each pixel in order to enhance a condensing ratio per pixel. A refractive index of the micro lens 100 depends on a wavelength of incident light (dependence on the wavelength).

Especially, as shown in FIG. 11, when the light strikes from an oblique direction of the micro lens 100, the above-described dependence on the wavelength becomes remarkable, and light having a wavelength that is not condensed on a light receiving section 102 is also generated (oblique incidence characteristic).

BRIEF SUMMARY OF THE INVENTION

An object of one mode of the present invention is to obtain images having an appropriate white balance even in any combination in an image sensing apparatus capable of enhancing precision of white balance adjustment and changing a photographing lens or an image sensing element.

To achieve this object, according to one mode of the present invention, there is provided an image sensing apparatus comprising: an image sensing section having an image sensing element which picks up a subject image passed through a photographing lens having a diaphragm regulating a quantity of light to thereby output an image signal; a storage section which stores a white balance modification coefficient to further modify a white balance correction coefficient in accordance with an optical characteristic of the image sensing section, the white balance correction coefficient performing white balance correction with respect to the image signal output from the image sensing section in accordance with an incidence characteristic upon the image sensing element based on optical characteristics including setting of the diaphragm of the photographing lens; and an adjustment control section which performs white balance adjustment with respect to the image signal output from the image sensing section based on the white balance correction coefficient modified by the white balance modification coefficient.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

First, a constitution of an image sensing apparatus according to a first embodiment of the present invention will be described with reference to FIG. 1.

Here, a camera system in which a camera main body is combined with a replaceable photographing lens (hereinafter referred to as a replaceable lens) will be described as an example of this image sensing apparatus.

Figure 1:
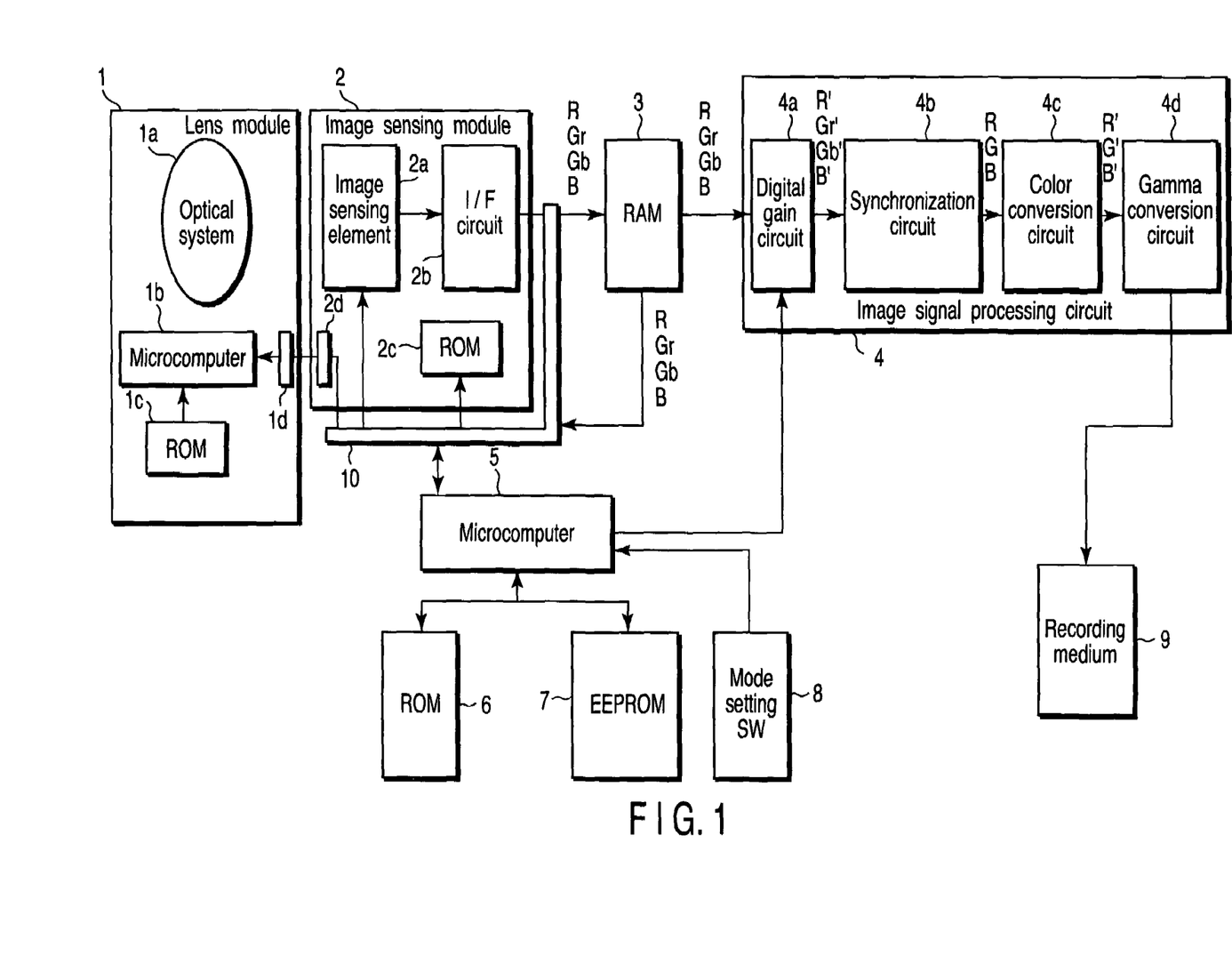
FIG. 1 is a constitution diagram of an image sensing apparatus according to a first embodiment of the present invention.

As shown in FIG. 1, the camera system which is the image sensing apparatus according to the first embodiment of the present invention has a lens module 1, an image sensing module 2, a RAM 3, an image signal processing circuit 4, a microcomputer 5, a ROM 6, an EEPROM 7, a mode setting SW 8, a recording medium 9 and the like. The lens module 1 is disposed on the side of the replaceable lens. Other constituting elements are disposed on the side of a camera main body to which the replaceable lens is attachable.

In the lens module 1 on the replaceable lens side, an optical system 1a including a photographing lens, zoom lens, diaphragm and the like, a microcomputer 1b which controls the whole lens module, a ROM 1c in which various data and the like are stored, a communication section 1d and the like are disposed. At least a first table is stored in this ROM 1c as described later in detail. The lens module 1 is detachably connected to the image sensing module 2 via a connecter, and is electrically connected to the same via a communication section 1d and 2d. The communication sections 1d and 2d are constituted as connectors.

Moreover, the image sensing module 2 on the camera main body side is provided with an image sensing element 2a such as a CCD, an interface (hereinafter referred to as I/F) circuit 2b, and a ROM 2c for temporarily storing various data. The RAM 3 interposed between the image sensing module 2 and the image signal processing circuit 4 stores an image signal sent from the I/F circuit 2b. The image sensing module 2 is detachably connected to the camera main body side via a connecter, and is electrically connected to the same via a communication section 10.

In more detail, the image signal processing circuit 4 has a digital gain circuit 4a, a synchronization circuit 4b, a color conversion circuit 4c, and a gamma conversion circuit 4d.

The digital gain circuit 4a amplifies an red (R) signal, a green (Gr) signal, a green (Gb) signal, and a blue (B) signal which are image signals for colors, temporarily stored in the RAM 3 with digital gains calculated by the microcomputer 5 in a method described later in detail, and accordingly outputs an R' signal, a Gr' signal, a Gb' signal, and a B' signal as level-adjusted signals.

That is, the digital gains amplify the signal for each color, included in the image signals output from the image sensing element 2a.

Moreover, the synchronization circuit 4b includes a sample holding circuit (not shown) and the like, performs a synchronization process of the R', Gr', Gb', and B' signals, and outputs the R, G, and B signals. The color conversion circuit 4c subjects these R, G, and B signals to color conversion, and outputs R', G', and B' signals. The gamma conversion circuit 4d γ-converts these R', G', and B' signals, and records the results in the recording medium 9.

Additionally, the ROM 6 stores at least a second table described later in detail. The EEPROM 7 stores various data. The mode setting SW 8 switches various modes.

It is to be noted that image sensing means described in claims corresponds to the image sensing element 2a, image sensing module 2 including the element or the like, image signal processing means corresponds to the image signal processing circuit 4 or the like, storage means corresponds to the ROM 1c in the lens module 1, the ROM 6 on the camera main body side or the like, and control means corresponds to the microcomputer 5 or the like. Correction coefficient storage means described in claims corresponds to the ROM 1c of the lens module 1 or the like, modification coefficient storage means corresponds to the ROM 6 or the like, and white balance adjustment means corresponds to the image signal processing circuit 4 or the like. Moreover, communication means corresponds to the communication section 1d, 10 or the like. Additionally, the present invention is not limited to the above-described relations.

In this constitution, a subject image which has struck via the photographing lens, zoom lens, and diaphragm of the optical system 1a of the lens module 1 is picked up by the image sensing element 2a of the image sensing module 2, and an image signal is output, and stored in the RAM 3 via the I/F circuit 2b.

In the ROM 1c of the lens module 1 on the replaceable lens side, at least the first table is stored in which diaphragm values are associated with white balance (hereinafter referred to as WB) correction coefficients for performing correction corresponding to characteristics relating to the diaphragm of the optical system 1a.

Here, the WB correction coefficient is a coefficient for performing the correction corresponding to the characteristics relating to the diaphragm of the optical system 1a in the first embodiment.

On the other hand, in the ROM 6 on the camera main body side, the WB modification coefficient further modifies the WB correction coefficient. In the ROM 6, at least a second table is stored in which the correction coefficient is associated with the WB modification coefficient for performing the correction corresponding to optical characteristics of the image sensing element 2a.

Here, the WB modification coefficient further modifies the WB correction coefficient, and performs the correction corresponding to the optical characteristics of the image sensing element 2a for use.

This second table is predetermined based on the optical characteristics of the image sensing element 2a.

The storage place of each table is one example, and, needless to say, the present invention is not limited to this.

The microcomputer 5 calculates the digital gains based on a WB mode set by the mode setting SW 8. Here, two different WB modes will be described hereinafter as first and second WB modes.

For example, an operation of the first WB mode will be performed as follows. That is, the WB correction coefficient corresponding to the diaphragm value, and the WB modification coefficient are calculated based on the first and second tables. Moreover, values obtained by multiplying the WB gains by the WB correction and modification coefficients are digital gains for amplifying the signals for the respective colors included in the image signals output from the image sensing element 2a.

$$\text{Digital gain} = WB \text{ gain} \times WB \text{ correction coefficient} \times WB \text{ modification coefficient} \quad (1)$$

WB adjustment is controlled to be performed based on the digital gain by the image signal processing circuit 4.

The image signal of the RAM 3 is read by the image signal processing circuit 4, and the image signal is subjected to white balance adjustment based on the digital gain calculated as described above.

On the other hand, an operation of a second WB mode will be performed as follows. That is, the microcomputer 5 calculates a first WB correction coefficient corresponding the diaphragm value at a prior photographing time based on the first table.

Here, the prior photographing refers to the photographing which is performed prior to actual photographing of the subject image in order to obtain predetermined data, and the photographing of the actual desired subject image will be referred to as the actual photographing.

Furthermore, a second WB correction coefficient corresponding the diaphragm value at the time of the actual photographing, and the WB modification coefficient are read based on the first and second tables.

Moreover, a value of the WB gain multiplied by a value obtained by dividing the second WB correction coefficient by the first WB correction coefficient, and the WB modification coefficient is obtained as the digital gain for amplifying the signal for each color included in the image signal output from the image sensing element 2a.

$$\text{Digital gain} = WB \text{ gain} \times (WB \text{ correction coefficient } (F \text{ value at actual photographing time})/WB \text{ correction coefficient } (F \text{ value at prior photographing time})) \times WB \text{ modification coefficient } (WB \text{ correction coefficient at actual photographing time}) \quad (2)$$

The WB adjustment by the image signal processing circuit 4 is controlled to be performed based on this digital gain. The image signal of the RAM 3 is read by the image signal processing circuit 4, and the WB adjustment is performed with respect to the image signal based on the digital gain calculated as described above.

Here, a spectral sensitivity distribution of the image sensing element will be described with reference to FIG. 2.

Figure 2:
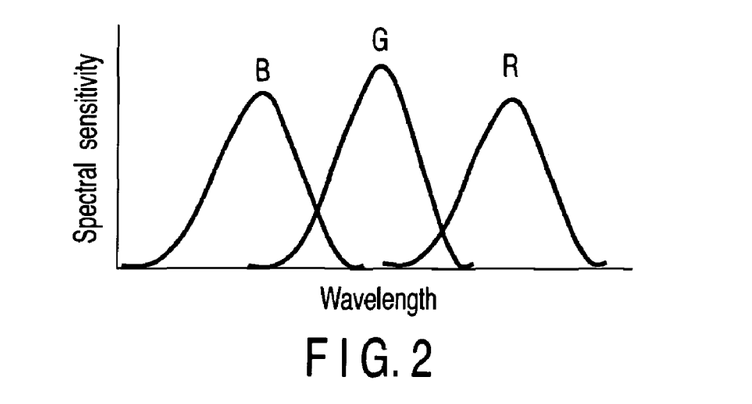
FIG. 2 is a diagram showing a spectral sensitivity distribution of an image sensing element.

The image sensing element 2a has spectral sensitivity characteristics shown in FIG. 2. The characteristics of R, G, and B light components are as shown in FIG. 2. Sensitivities of human eyes with respect to the colors are strongest with respect to G light components, and the G light components are seen brightest.

It is to be noted that the image sensing module 2 including this image sensing element 2a can be replaced with another image sensing module including an image sensing element having different optical characteristics. Accordingly, image sensing modules suitable for photographing purposes are usable such as an image sensing module suitable for nighttime photographing, and an image sensing module suitable for a broad dynamic range.

Dependence of light receiving sensitivity of the image sensing element on an incidence angle will be described with reference to FIG. 3.

Figure 3:
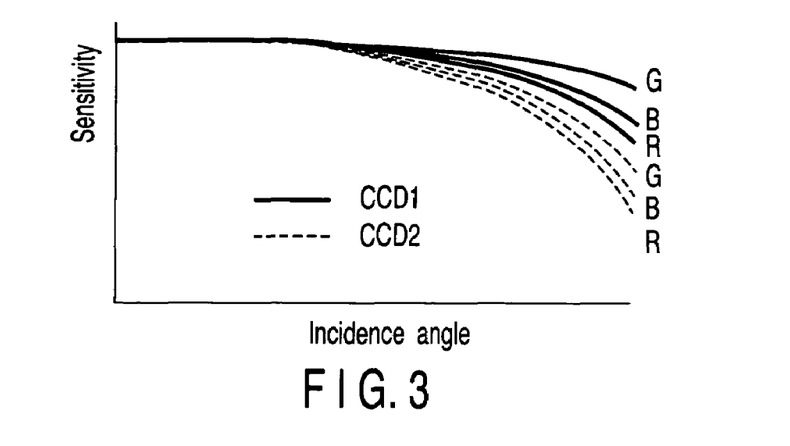
FIG. 3 is a diagram showing dependence of light receiving sensitivity of the image sensing element on an incidence angle.

As shown in FIG. 3, the image sensing element 2a has dependence on the incidence angle, and a relative sensitivity fluctuates by the incidence angle of the light. That is, as the incidence angle of the light increases, a difference is generated in a drop of the relative sensitivity with respect to each of the R, G, and B light components. A drop degree represented as the relative sensitivity (R/G, B/G) especially with respect to the G light component increases. Furthermore, a degree of the fluctuation differs for each image sensing element by fluctuations in designing a micro lens or manufacturing the image sensing element 2a.

Dependence of an output of the image sensing element on an F value will be described with reference to FIG. 4.

Figure 4:
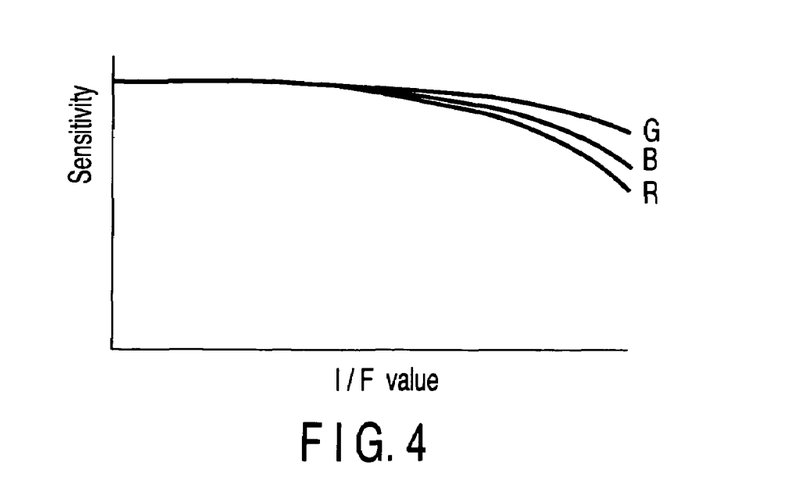
FIG. 4 is a diagram showing dependence of an output of the image sensing element on F value.

As shown in FIG. 4, even when micro lenses disposed for pixels are prepared under the same design, a 1/F value increases in a relation between an inverse number (1/F) of an F value and relative sensitivity (R/G, B/G) (i.e., the diaphragm opens), and accordingly a drop is generated in the relative sensitivity with respect to R, G, and B light components. Moreover, a degree of the drop of the relative sensitivity largely differs with each light component.

Figure 5:
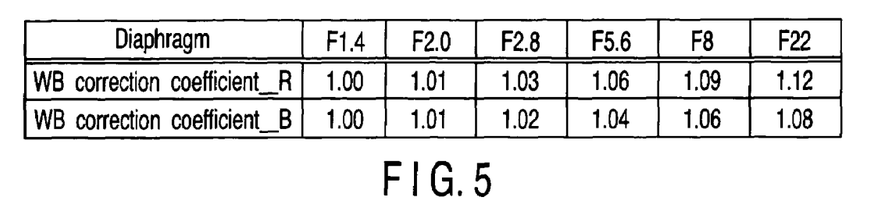
FIG. 5 is a diagram showing a WB correction coefficient correspondence table.
Figure 6:
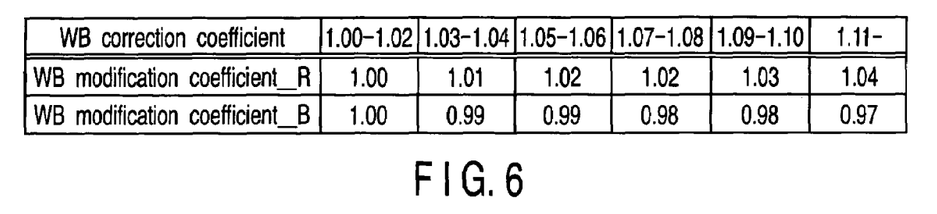
FIG. 6 is a diagram showing a WB modification coefficient correspondence table.

In view of the above-described properties, in the image sensing apparatus according to the first embodiment of the present invention, the digital gain is calculated using a WB correction coefficient correspondence table which is the first table, and a WB modification coefficient correspondence table which is the second table, and the signal for each color is amplified with the digital gain.

This will be described hereinafter in detail.

First, the WB correction coefficient correspondence table will be described with reference to FIG. 5.

As shown in FIG. 5, in the WB correction coefficient correspondence table, diaphragm values are associated with WB correction coefficients of R, B signals. In this WB correction coefficient correspondence table, one selected image sensing element is positioned with an image sensing element which is a reference, and correction coefficients of gains of the R and B signals are determined in consideration of the dependence of the image sensing element constituting the reference on the incidence angle. As described above, as to the dependence of the image sensing element on the incidence angle, when the incidence angle increases, the drop of the relative sensitivity with respect to the R and B signals remarkably appears, and this WB correction coefficient compensates for this drop. It is to be noted that the WB correction coefficient correspondence table is stored, for example, in the ROM 1c in the lens module 1 of FIG. 1.

Next, a WB modification coefficient correspondence table will be described with reference to FIG. 6.

As shown in FIG. 6, in the WB modification coefficient correspondence table, the WB correction coefficients read from FIG. 5 are associated with WB modification coefficients of R and B signals.

For example, when this WB correction coefficient is 1.03, a WB modification coefficient_R corresponding to the optical characteristic of the image sensing element 2a is 1.01, and a WB modification coefficient_B is 0.99 from the WB modification coefficient correspondence table.

It is to be noted that this WB modification coefficient correspondence table is stored in the ROM 2c of the image sensing module.

In the image sensing apparatus according to this embodiment, the microcomputer 5 calculates the digital gain referring to the correspondence tables of FIGS. 5 and 6.

More concretely, the microcomputer 5 reads a WB correction coefficient_R and a WB correction coefficient_B corresponding to the diaphragm value of the optical system 1a from the ROM 1c referring to the correspondence table of FIG. 5.

Moreover, the microcomputer reads the WB modification coefficient_R corresponding to the WB correction coefficient_R, and the WB modification coefficient_B corresponding to the WB correction coefficient_B from the ROM 6 referring to the correspondence table of FIG. 6. Furthermore, the microcomputer calculates the digital gain based on them. For example, the microcomputer 5 calculates the digital gain based on equation (1) in the first WB mode, and based on equation (2) in the second WB mode.

An operation at the time of the prior photographing of the image sensing apparatus according to the first embodiment of the present invention will be described hereinafter in detail with reference to a flowchart of FIG. 5, and appropriately with reference to FIGS. 5, 6 here.

Figure 7:
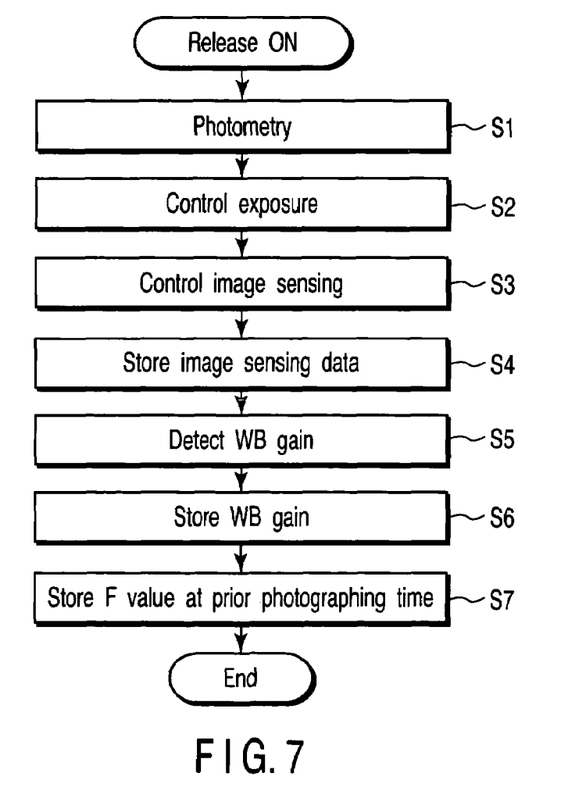
FIG. 7 is a flowchart showing an operation at a prior photographing time of the image sensing apparatus according to the first embodiment of the present invention.

A release switch (not shown) is turned on to enter the operation at the time of the prior photographing, and then the microcomputer 5 first performs predetermined photometry calculation, exposure control, and image sensing control (steps S1 to S3). Moreover, the microcomputer stores image sensing data (image signal) from the image sensing element 2a in the RAM 3 (step S4).

Next, the microcomputer 5 detects the WB gain based on the image signal (step S5), and stores the WB gain in the EEPROM 7 (step S6). Furthermore, the microcomputer stores the F value at the prior photographing time in the EEPROM 7 (step S7), and ends the operation at the prior photographing time.

By the above-described process according to one example, the WB gain at the prior photographing time, for use in subsequent processes, is associated with the F value, and stored in the EEPROM 7.

Figure 8:
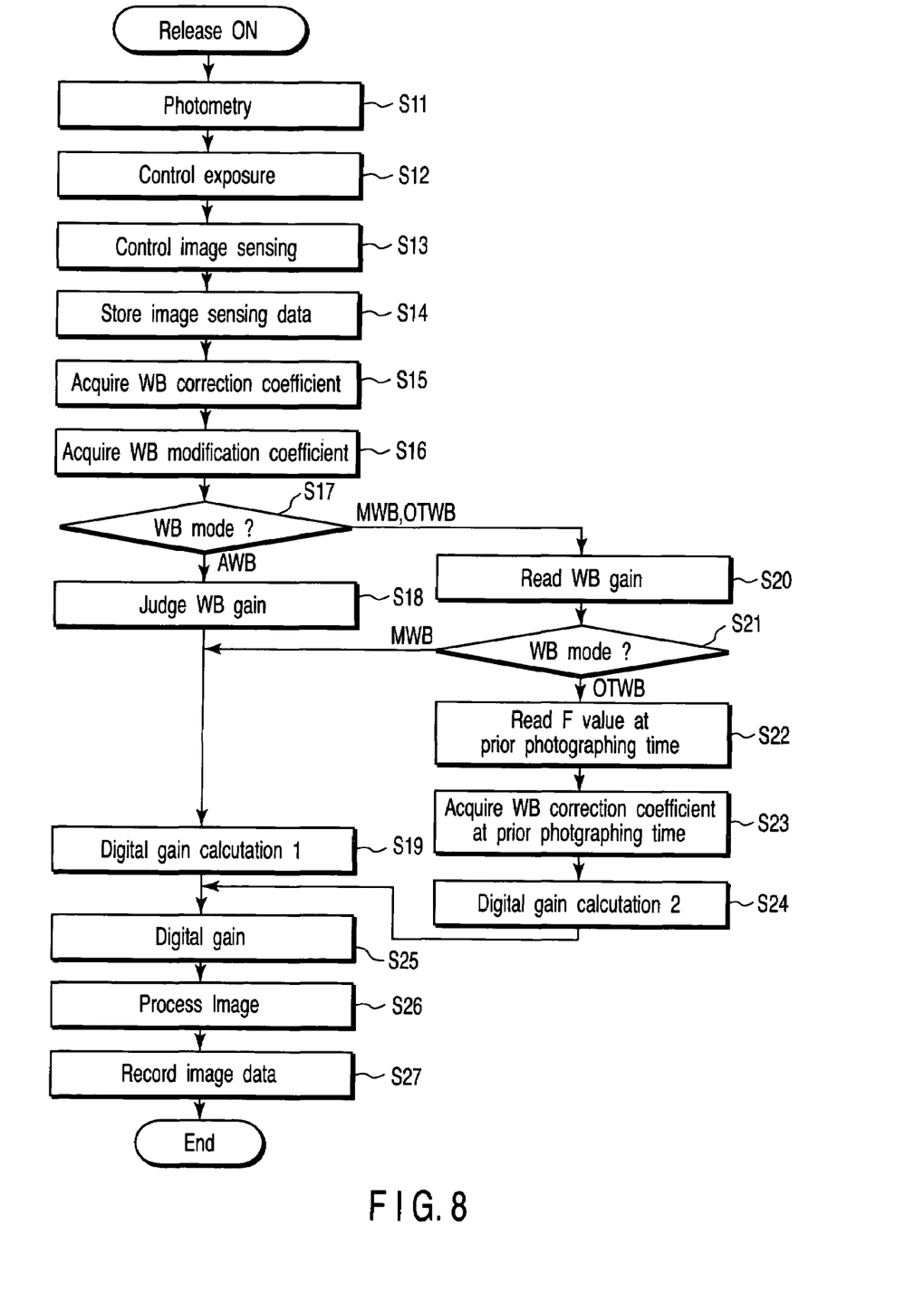
FIG. 8 is a flowchart showing an operation at an actual photographing time of the image sensing apparatus according to the first embodiment of the present invention.

Next, an operation at the time of the actual photographing of the image sensing apparatus according to the first embodiment of the present invention will be described in detail with reference to a flowchart of FIG. 8, and appropriately with reference to FIGS. 5, 6 here.

When entering the operation at the actual photographing time, first the microcomputer 5 performs predetermined photometry calculation, exposure control, and image sensing control (steps S11 to S13).

The image sensing element 2a stores image sensing data (image signal) in the RAM 3 (step S14).

Next, the microcomputer reads the WB correction coefficient_R and WB correction coefficient_B corresponding to the F value at the actual photographing time (from the ROM 1c) referring to the WB correction coefficient correspondence table of FIG. 5 (step S15).

Furthermore, the microcomputer reads the WB modification coefficient_R and WB modification coefficient_B corresponding to the WB correction coefficient_R and WB correction coefficient_B (from the ROM 6) referring to the WB modification coefficient correspondence table of FIG. 6 (step S16).

Next, the microcomputer 5 judges whether the WB mode is set to any of an automatic WB (hereinafter referred to as AWB), manual WB (hereinafter referred to as MWB), and one-touch WB (hereinafter referred to as OTWB) in the mode setting SW 8 (step S17).

Here, the AWB mode is a mode in which white balance adjustment suitable for a scene is automatically performed based on image sensing data. In the MWB mode, the white balance adjustment suitable for the scene is manually designated beforehand by a photographer. Moreover, in the OTWB mode, the white balance is adjusted based on a white balance adjustment gain obtained beforehand by picking up a subject image which is a white reference.

First, when judging that the AWB mode is set in the step S17, the microcomputer 5 analyzes the image sensing data, and performs judgment concerning the WB gain (step S18).

Moreover, the WB correction coefficient_R and WB correction coefficient_B read in the step S15, the WB modification coefficient_R and WB modification coefficient_B read in the step S16, and the WB gain obtained in the step S18 are substituted into the calculation equation (1), and accordingly the digital gains of the R and B signals are calculated (step S19).

Thereafter, the process advances to processes of and after step S25.

On the other hand, when judging that the MWB mode is set in the step S17, the microcomputer 5 reads the WB gain designated beforehand by the photographer from the ROM 6 (step S20).

Moreover, the process advances to an MWB side of the judgment of the step S21. The microcomputer substitutes the WB correction coefficient_R and WB correction coefficient_B read in the step S15, the WB modification coefficient_R and WB modification coefficient_B read in the step S16, and the WB gain at the prior photographing time obtained in the step S20 into the calculation equation (1), and calculates the digital gains of the R and B signals (step S19).

Thereafter, the process advances to the processes of and after the step S25. Here, the white balance adjustment gain designated in the MWB mode is stored beforehand in the ROM 6.

Furthermore, when judging that the OTWB mode is set in the step S17, the microcomputer 5 reads the WB gain obtained at the prior photographing time (from the EEPROM 7) (step S20).

Moreover, the process advances to an OTWB side of the judgment of the step S21. The microcomputer reads the F value at the prior photographing time (step S22), and reads the WB correction coefficient at the prior photographing time from the EEPROM 7 (step S23). Moreover, the microcomputer substitutes the WB correction coefficient_R and WB correction coefficient_B at the actual photographing time read in the step S15, the WB gain at the prior photographing time read in the step S20, and the F value at the prior photographing time, and the WB correction coefficient_R and WB correction coefficient_B read in the steps S22, 23 into the calculation equation (2), and calculates the digital gains of the R and B signals (step S24).

Thereafter, the process advances to the processes of and after the step S25.

Thus, the digital gain circuit 4a amplifies R, Gr, Gb, and B signals which are image signals temporarily stored in the RAM 3 with the digital gain calculated by the microcomputer 5 to thereby adjust levels, and outputs R', Gr', Gb', and B' signals (step S25).

Furthermore, the synchronization circuit 4b performs synchronization of the R', Gr', Gb', and B' signals, and outputs the R, G, and B signals.

Moreover, the color conversion circuit 4c subjects the R, G, and B signals to color conversion, and outputs R', G', and B' signals. Furthermore, the gamma conversion circuit 4d subjects these R', G', and B' signals to $\gamma$ conversion (step S26).

Results obtained in this manner are recorded in the recording medium 9 (step S27).

Second Embodiment

An image sensing apparatus according to a second embodiment of the present invention will be described in a case where an image sensing module comprising a CCD having a WB modification coefficient correspondence table of FIG. 9 and characteristics is attached instead of the image sensing module comprising the CCD having the WB modification coefficient correspondence table of FIG. 6 and the characteristics. In this CCD of the image sensing module, a CCD (hereinafter referred to as a narrow pitch module) having an adjacent pixel pitch narrower than that of an image sensing element 2a is used.

Here, as shown in FIG. 1, the image sensing module is electrically connected to a lens module via a communication section 1d and 2d. The image sensing module is electrically connected to a microcomputer, RAM 3 and the like of the image sensing apparatus via a communication section 10. The communication sections 1d, 2d and 10 are constituted as connectors, and the image sensing module is accordingly set to be attachable/detachable in this example.

Figure 9:
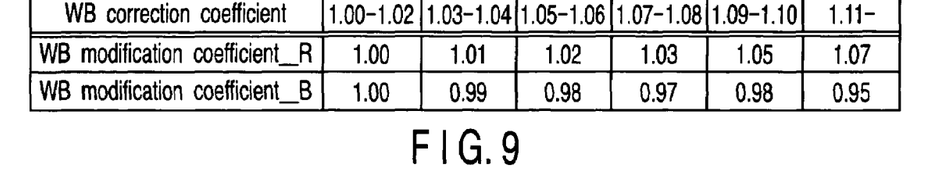
FIG. 9 is a diagram showing a WB correction coefficient correspondence table.

In the image sensing apparatus according to the second embodiment of the present invention, a digital gain is calculated using a WB correction coefficient correspondence table of FIG. 5 which is a first table and a WB modification coefficient correspondence table of FIG. 9 which is a second table, and a signal for each color is amplified with the digital gain. This will be described hereinafter in detail.

Since FIG. 5 has been described above in the embodiment, the description is omitted here. The WB modification coefficient correspondence table of FIG. 9 will be described.

As shown in FIG. 9, in the WB modification coefficient correspondence table, WB correction coefficients read from FIG. 5 are associated with WB modification coefficients of R and B signals.

Here, by the WB modification coefficients of FIG. 9, excessive/insufficient correction with respect to optical characteristics of an image sensing element which is a reference is further modified. When the WB correction coefficient is corrected by the WB modification coefficient having this narrow pitch module, for example, correction can be performed in the same manner as in appropriate WB correction performed in the first embodiment. In comparison of FIG. 9 with FIG. 6, through regulation, the WB modification coefficients of FIG. 9 corresponding to the narrow pitch module is more strongly influenced by incidence angles, and therefore the modification coefficients have increasing modification amounts.

It is to be noted that correspondence between the modification coefficient and each diaphragm, and resolution of precision may be varied in such a manner as to achieve optimum correction by the optical characteristics of the image sensing element of the attached image sensing module. For example, the correspondence between the modification coefficient and each diaphragm value may be adjusted into the resolution in accordance with a correction amount, or the correction coefficients with respect to zoom positions may be set with respect to not only TELE, WIDE positions but also different focal distances.

This WB modification coefficient correspondence table is stored in an ROM 2c of an image sensing module 2 in the same manner as in the first embodiment.

Third Embodiment

An image sensing apparatus according to a third embodiment of the present invention will be described in a case where a lens module (hereinafter referred to as a zoom lens module) comprising a zoom lens having a WB correction coefficient correspondence table of FIG. 10, instead of the WB correction coefficient correspondence table of FIG. 5 described above, and characteristics is attached.

Here, as shown in FIG. 1, an image sensing module is electrically connected to the zoom lens module via a communication section 1d and 2d. The communication section 1d and 2d are constituted as a connector, and accordingly set to be attachable/detachable in the same manner as in the second embodiment.

Figure 10:
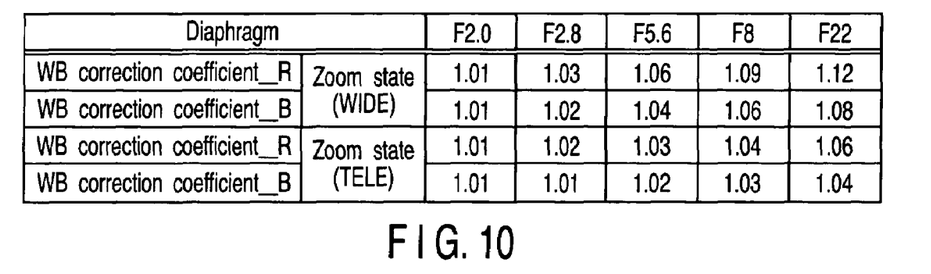
FIG. 10 is a diagram showing a WB modification coefficient correspondence table.

In the image sensing apparatus according to the third embodiment of the present invention, a digital gain is calculated using a WB correction coefficient correspondence table of FIG. 10 which is a first table and a WB modification coefficient correspondence table of FIG. 6 which is a second table, and a signal for each color is amplified with the digital gain. This will be described hereinafter in detail.

The WB correction coefficient correspondence table of FIG. 10 will be described hereinafter.

In the zoom lens, an influence of a diaphragm of a luminous flux which enters an image sensing element differs with a focal distance. Therefore, as shown in FIG. 5, in the WB correction coefficient correspondence table, diaphragm values are associated with WB correction coefficients of the R and B signals in focal distances on a wide angle side (WIDE) and a telescope side (TELE). It is to be noted that the WB correction coefficient correspondence table is stored, for example, in an ROM 1c in the zoom lens module.

Here, the WB correction coefficients of FIG. 10 indicate excess/shortage of correction with respect to optical characteristics of a photographing lens which is a reference. When the correction is performed by the WB correction coefficient of the zoom lens module and the WB modification coefficient of the image sensing module, for example, correction can be performed in the same manner as in appropriate WB correction performed in the first embodiment. As seen from FIG. 10, in a short focal distance (i.e., the wide side), the correction value of the WB correction coefficient is larger even in the same diaphragm.

It is to be noted that correspondence between the modification coefficient and each diaphragm, and resolution of precision may be varied in such a manner as to achieve optimum correction by the optical characteristics of the photographing lens of the attached lens module.

Even when the combination of the lens module with the image sensing module is changed as described above, or in any of the above-described embodiments, the appropriate WB correction can be performed.

As described above, according to the embodiments of the present invention, the precision of the WB adjustment is enhanced, so-called color fogging phenomenon is suppressed, and an appropriately exposed image is obtained.

Moreover, in the calculation of the digital gain relating to the WB adjustment, a preferable process can be performed in accordance with various photographing modes. Furthermore, the WB adjustment can be performed fully considering the fluctuations of the image sensing element at a manufacturing time, optical characteristics of the micro lens and the like.

The first to third embodiments of the present invention have been described above, but the present invention is not limited to these embodiments, and can be variously modified/changed within the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image sensing apparatus capable of performing prior photographing to pick up an image of a subject which constitutes a white reference beforehand and accordingly calculate a gain for white balance adjustment prior to actual photographing, the apparatus comprising:

image sensing section which picks up a subject image passed through an optical system to thereby output an image signal;

image signal processing section which adjusts a white balance with respect to the image signal output from the image sensing section; and control section which reads a first white balance correction coefficient performing correction corresponding to a characteristic relating to a diaphragm of the optical system and corresponding to a diaphragm value at a prior photographing time at an actual photographing time, reading a second white balance correction coefficient further performing correction corresponding to the characteristic relating to the diaphragm of the optical system and corresponding to a diaphragm value at the actual photographing time, and a white balance modification coefficient further modifying the first and second white balance correction coefficients and performing correction corresponding to an optical characteristic of the image sensing section, calculating a digital gain amplifying a signal for each color included in the image signal output from the image sensing section by the white balance modification coefficient, and adjusting the white balance by the image signal processing means based on the digital gain.

2. An image sensing apparatus comprising:

image sensing section which picks up a subject image passed through an optical system to thereby output an image signal;

image signal processing section which adjusts a white balance based on the image signal output from the image sensing section;

storage section which stores at least a first table in which a diaphragm value is associated with a white balance correction coefficient performing correction corresponding to a characteristic relating to a diaphragm of the optical system, and a second table in which the white balance correction coefficient is associated with a white balance modification coefficient further modifying the white balance correction coefficient and performing correction corresponding to an optical characteristic of the image sensing section; and control section which calculates the white balance correction coefficient corresponding to a diaphragm value, and the white balance modification coefficient based on the first and second tables, multiplying the white balance gain by the white balance correction coefficient and the white balance modification coefficient to thereby obtain a value as a digital gain amplifying a signal for each color included in the image signal output from the image sensing section, and executing a control based on the digital gain to thereby adjust the white balance by the image signal processing section.

3. The image sensing apparatus according to claim 2, wherein the second table is determined beforehand based on the optical characteristic of an image sensing element.

4. An image sensing apparatus comprising:
image sensing section which picks up a subject image passed through an optical system to thereby output an image signal;
image signal processing section which adjusts a white balance based on the image signal output from the image sensing section;
storage section which stores at least a first table in which a diaphragm value is associated with a white balance correction coefficient performing correction corresponding to a characteristic relating to a diaphragm of the optical system, and a second table in which the white balance correction coefficient is associated with a white balance modification coefficient further modifying the white balance correction coefficient and performing correction corresponding to an optical characteristic of the image sensing section; and
control section which calculates a first white balance correction coefficient corresponding to a diaphragm value at a prior photographing time based on the first table, reading a second white balance correction coefficient corresponding to a diaphragm value at an actual photographing time, and a white balance modification coefficient based on the first and second tables, multiplying a white balance gain by a value obtained by dividing the second white balance correction coefficient by the first white balance correction coefficient, and the white balance modification coefficient to thereby obtain a value as a digital gain amplifying a signal for each color included in the image signal out from the image sensing section, and executing a control based on the digital gain to thereby adjust the white balance by the image signal processing means at the actual photographing time.

5. The image sensing apparatus according to claim 4, wherein the second table is determined beforehand based on an optical characteristic of an image sensing element.

6. An image sensing apparatus comprising:
image sensing section which picks up a subject image passed through an optical system to thereby output an image signal;
image signal processing section which adjusts a white balance with respect to the image signal output from the image sensing section based on a white balance gain;
storage section which stores at least a first table in which a diaphragm value is associated with a white balance correction coefficient performing correction corresponding to a characteristic relating to a diaphragm of the optical system, arid a second table in which the white balance correction coefficient is associated with a white balance modification coefficient further modifying the white balance correction coefficient and performing correction corresponding to an optical characteristic of the image sensing section;

switching section which switches a photographing mode; and control section which reads the white balance correction coefficient corresponding to the diaphragm value, and the white balance modification coefficient based on the first and second tables, multiplying the white balance gain by the white balance correction coefficient and the white balance modification coefficient to thereby obtain a value as a digital gain amplifying a signal for each color included in the image signal output from the image sensing section, and executing a control based on the digital gain in such a manner as to adjust the white balance by the image signal processing section in a first photographing mode, and reading a first white balance correction coefficient corresponding to a diaphragm value at a prior photographing time based on the first table, reading a second white balance correction coefficient corresponding to a diaphragm value at an actual photographing time, and the white balance modification coefficient based on the first and second tables, multiplying the white balance gain by a value obtained by dividing the second white balance correction coefficient by the first white balance correction coefficient, and the white balance modification coefficient to thereby obtain a value as a digital gain amplifying a signal for each color included in the image signal output from the image sensing section, and executing a control based on the digital gain to thereby adjust the white balance by the image signal processing section in a second photographing mode.

7. The image sensing apparatus according to claim 6, wherein the second table is determined beforehand based on an optical characteristic of an image sensing element.

8. An image sensing apparatus capable of performing prior photographing to pick up an image of a subject which constitutes a white reference beforehand and accordingly calculate a gain for white balance adjustment prior to actual photographing, the apparatus comprising:
image sensing means for picking up a subject image passed through an optical system to thereby output an image signal;
image signal processing means for adjusting a white balance with respect to the image signal output from the image sensing means; and
control means for reading a first white balance correction coefficient performing correction corresponding to a characteristic relating to a diaphragm of the optical system and corresponding to a diaphragm value at a prior photographing time at an actual photographing time, reading a second white balance correction coefficient further performing correction corresponding to the characteristic relating to the diaphragm of the optical system and corresponding to a diaphragm value at the actual photographing time, and a white balance modification coefficient further modifying the first and second white balance correction coefficients and performing correction corresponding to an optical characteristic of the image sensing means, calculating a digital gain amplifying a signal for each color included in the image signal output from the image sensing means by the white balance modification coefficient, and adjusting the white balance by the image signal processing means based on the digital gain.

9. An image sensing apparatus comprising:

image sensing means for picking up a subject image passed through an optical system to thereby output an image signal;

image signal processing means for adjusting a white balance based on the image signal output from the image sensing means;

storage means for storing at least a first table in which a diaphragm value, is associated with a white balance correction coefficient performing correction corresponding to a characteristic relating to a diaphragm of the optical system, and a second table in which the white balance correction coefficient is associated with a white balance modification coefficient further modifying the white balance correction coefficient and performing correction corresponding to an optical characteristic of the image sensing means; and control means for calculating the white balance correction coefficient corresponding to a diaphragm value, and the white balance modification coefficient based on the first and second tables, multiplying the white balance gain by the white balance correction coefficient and the white balance modification coefficient to thereby obtain a value as a digital gain amplifying a signal for each color included in the image signal output from the image sensing means, and executing a control based on the digital gain to thereby adjust the white balance by the image signal processing means.

10. An image sensing apparatus comprising:

image sensing means for picking up a subject image passed through an optical system to thereby output an image signal;

image signal processing means for adjusting a white balance based on the image signal output from the image sensing means;

storage means for storing at least a first table in which a diaphragm value is associated with a white balance correction coefficient performing correction corresponding to a characteristic relating to a diaphragm of the optical system, and a second table in which the white balance correction coefficient is associated with a white balance modification coefficient further modifying the white balance correction coefficient and performing correction corresponding to an optical characteristic of the image sensing means; and control means for calculating a first white balance correction coefficient corresponding to a diaphragm value at a prior photographing time based on the first table, reading a second white balance correction coefficient corresponding to a diaphragm value at an actual photographing time, and a white balance modification coefficient based on the first and second tables, multiplying a white balance gain by a value obtained by dividing the second white balance correction coefficient by the first white balance correction coefficient, and the white balance modification coefficient to thereby obtain a value as a digital gain amplifying a signal for each color included in the image signal output from the image sensing means, and executing a control based on the digital gain to thereby adjust the white balance by the image signal processing means at the actual photographing time.

11. An image sensing apparatus comprising:

image sensing means for picking up a subject image passed through an optical system to thereby output an image signal;

image signal processing means for adjusting a white balance with respect to the image signal output from the image sensing means based on a white balance gain;

storage means for storing at least a first table in which a diaphragm value is associated with a white balance correction coefficient performing correction corresponding to a characteristic relating to a diaphragm of the optical system, and a second table in which the white balance correction coefficient is associated with a white balance modification coefficient further modifying the white balance correction coefficient and performing correction corresponding to an optical characteristic of the image sensing means;

switching means for switching a photographing mode; and control means for reading the white balance correction coefficient corresponding to the diaphragm value, and the white balance modification coefficient based on the first and second tables, multiplying the white balance gain by the white balance correction coefficient and the white balance modification coefficient to thereby obtain a value as a digital gain amplifying a signal for each color included in the image signal output from the image sensing means, and executing a control based on the digital gain in such a manner as to adjust the white balance by the image signal processing means in a first photographing mode, and reading a first white balance correction coefficient corresponding to a diaphragm value at a prior photographing time based on the first table, reading a second white balance correction coefficient corresponding to a diaphragm value at an actual photographing time, and the white balance modification coefficient based on the first and second tables, multiplying the white balance gain by a value obtained by dividing the second white balance correction coefficient by the first white balance correction coefficient, and the white balance modification coefficient to thereby obtain a value as a digital gain amplifying a signal for each color included in the image signal output from the image sensing means, and executing a control based on the digital gain to thereby adjust the white balance by the image signal processing means in a second photographing mode.

* * * * *